(12) United States Patent
Benedetti

(10) Patent No.: US 12,076,755 B2
(45) Date of Patent: Sep. 3, 2024

(54) APPARATUS FOR THE TREATMENT OF HORTICULTURAL PRODUCTS AND METHOD FOR CONTROLLING SUCH APPARATUS

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 15 days.

(21) Appl. No.: 17/631,716

(22) PCT Filed: Jul. 31, 2020

(86) PCT No.: PCT/IB2020/057244
§ 371 (c)(1),
(2) Date: Jan. 31, 2022

(87) PCT Pub. No.: WO2021/019503
PCT Pub. Date: Feb. 4, 2021

(65) Prior Publication Data
US 2022/0266307 A1    Aug. 25, 2022

(30) Foreign Application Priority Data

Jul. 31, 2019  (IT) .......................... 102019000013407

(51) Int. Cl.
*B07C 5/342* (2006.01)
*A23N 15/00* (2006.01)
*B65G 43/08* (2006.01)

(52) U.S. Cl.
CPC .............. *B07C 5/342* (2013.01); *A23N 15/00* (2013.01); *B65G 43/08* (2013.01)

(58) Field of Classification Search
CPC .. B07C 5/342; B07C 5/16; B07C 5/34; B07C 5/04; B07C 5/30; A23N 15/00; H01L 21/67276
See application file for complete search history.

(56) References Cited

U.S. PATENT DOCUMENTS 10,549,317 B2 *   2/2020   Benedetti ................ B07C 5/342
10,549,318 B2 *   2/2020   Benedetti .................. B07C 5/22
(Continued)

FOREIGN PATENT DOCUMENTS

JP        11314737 A  * 11/1999  ............... B07C 5/02
JP        H11314737 A    11/1999
(Continued)

OTHER PUBLICATIONS

Australian Examination Report for Australian Application 2020323771, dated Jan. 12, 2023, 3 pages.
(Continued)

*Primary Examiner* — Michael McCullough
*Assistant Examiner* — Jessica L Burkman
(74) *Attorney, Agent, or Firm* — CANTOR COLBURN LLP

(57) ABSTRACT

An apparatus for the treatment of horticultural products, including in series at least
  a first station, configured for supplying a handling and processing line with an indiscriminate mass of horticultural products,
  a second station, arranged along the line and configured for the acquisition of information related to at least one parameter of interest of each horticultural product in transit and for the transmission of the information to an electronic control and management unit, and
  a third station, arranged along the line and configured for the selective conveyance of each horticultural product in transit toward one of at least two distinct collection stations.
The apparatus includes an electronic vision device, arranged along a chosen point of the line that is between the first station and the second station and is configured to count the number of horticultural products in transit.

8 Claims, 1 Drawing Sheet

(56) References Cited

U.S. PATENT DOCUMENTS

| | | |
|---|---|---|
| 2006/0037892 A1 | 2/2006 | Blanc |
| 2011/0112684 A1 | 5/2011 | Pellenc |
| 2016/0016738 A1* | 1/2016 | Koetje ................. B65G 47/684 |
| | | 198/458 |

FOREIGN PATENT DOCUMENTS

| | | |
|---|---|---|
| WO | 2007000441 A1 | 1/2007 |
| WO | 2012106494 A1 | 8/2012 |
| WO | 2016108937 A1 | 7/2016 |
| WO | 2017144534 A1 | 8/2017 |

OTHER PUBLICATIONS

International Search Report issued Oct. 29, 2020 re: Application No. PCT/IB2020/057244, pp. 1-4, citing: WO 2007/000441 A1, US 2011/0112684 A1, JP H11 314 737 A, WO 2017/144534 A1, WO 2016/108937 A1 and WO 2012/106494 A1.
IT Search Report issued Apr. 16, 2020 re: Application No. IT 201900013407, pp. 1-7, citing: WO 2007/000441 A1, US 2011/0112684 A1, JP H11 314 737 A, WO 2017/144534 A1, WO 2016/108937 A1 and WO 2012/106494 A1.
Written Opinon issued Oct. 29, 2020 re: Application No. PCT/IB2020/057244, pp. 1-5, citing: WO 2007/000441 A1 and US 2011/0112684 A1.

* cited by examiner

APPARATUS FOR THE TREATMENT OF HORTICULTURAL PRODUCTS AND METHOD FOR CONTROLLING SUCH APPARATUS

TECHNICAL FIELD

The present disclosure relates to an apparatus for the treatment of horticultural products and to a method for controlling such apparatus.

BACKGROUND

Currently, along the production chain that has the task of bringing horticultural products into the homes of consumers, the industrial processes involved have an ever-increasing degree of automation, so as to be able to combine conflicting requirements such as the constantly increasing demand on the part of the market, cost containment, and a high-quality standard.

In this context, therefore, the companies in the field equip themselves with long automated lines which are fed upstream with indiscriminate masses of a specific horticultural product, which often originate directly from the picking fields and are usually accumulated in large containers which are indeed emptied into a first loading station of the line.

Along the line, the products are subjected to numerous processes, in order to select, clean, check, calibrate and finally sort them downstream into uniform groups, according to one or more parameters of interest. Typically, in fact, at the output of the line there is a plurality of crates or other containers, so as to be able to accommodate in each one of them all and only the products that have the same dimensions, the same color, the same weight, and/or in any case share compliance with a predefined criterion.

Lines of the type outlined above, however, are not free from drawbacks.

In the loading station, each container is progressively emptied at a preset rate, which usually corresponds to a given number of containers emptied in the unit time or to a given weight (in kilograms or, more easily, in tons) of products emptied in the unit time.

Whatever the criterion with which the supply rate is evaluated, it is in any case impossible to know precisely the number of products actually supplied to the line in the unit time.

Not infrequently, in fact, the containers are filled only partially (and in a variable percentage); furthermore, even assuming that one is able to rely on a constant filling level, the (random) irregularity in the weight and in the dimensions of the products (and the presence of unspecified masses of debris) in any case prevents achieving an equally constant number of products along the line.

On the other hand, in downstream stations each product must be managed individually, in order to be able to assess its parameters of interest and in order to allow the electronic control and management unit that supervises the operation to assign it to the most appropriate crate (as a function indeed of the detected parameters). Therefore, the work cycles of the elements inside said stations are programmed to treat a given number of items in the unit time, where this parameter is limited upward by technological constraints of various kinds and usually defines the production capacity of the line.

Unwelcome problems therefore occur in the transition from the loading station (and from any other stations in any case capable of operating on a more or less unspecified number of products in the unit time) to the downstream ones, which as mentioned require instead to be supplied with a very precise number of products in the unit time.

In fact, when the number of products in transit is lower than the expected capacity, the line operates at low efficiency; likewise, it is necessary to be equipped with systems capable of sending back upstream the excess products when indeed they transit in a number that exceeds the provided capacity.

These are in any case unwanted events, which increase costs and which production companies currently have been able to remedy only with improvised solutions which are in any case inadequate for the requirements of the market and for the profitability objectives that are set.

SUMMARY

The aim of the present disclosure is to solve the problems described above, providing an apparatus that adopts adequate solutions to compensate for any irregularities in the supply of the horticultural products.

Within this aim, the disclosure provides a control method which, in apparatuses for the treatment of horticultural products, allows to compensate for any irregularities in the supply of said products.

The disclosure also provides an apparatus that has particular methods for detecting the anomalies in the supply of the products and/or effective solutions for preventing stops and inefficiencies.

The disclosure further provides an apparatus and/or propose a method that ensure high reliability in operation.

The disclosure also provides an apparatus that adopts a technical and structural architecture that is alternative to those of apparatuses of the known type.

The disclosure provides an apparatus and/or a method that can be obtained easily starting from commonly commercially available elements and materials.

The disclosure provides an apparatus and/or a method that has low costs and is safe in application.

This aim and these and other advantages which will become better apparent hereinafter are achieved by providing an apparatus and by a method according to the claims.

BRIEF DESCRIPTION OF THE DRAWINGS

Further characteristics and advantages of the disclosure will become better apparent from the description of some preferred but not exclusive embodiments of the apparatus and of the method according to the disclosure, illustrated by way of non-limiting example in the accompanying drawings, wherein.

DETAILED DESCRIPTION OF THE DRAWINGS

Figure 1:
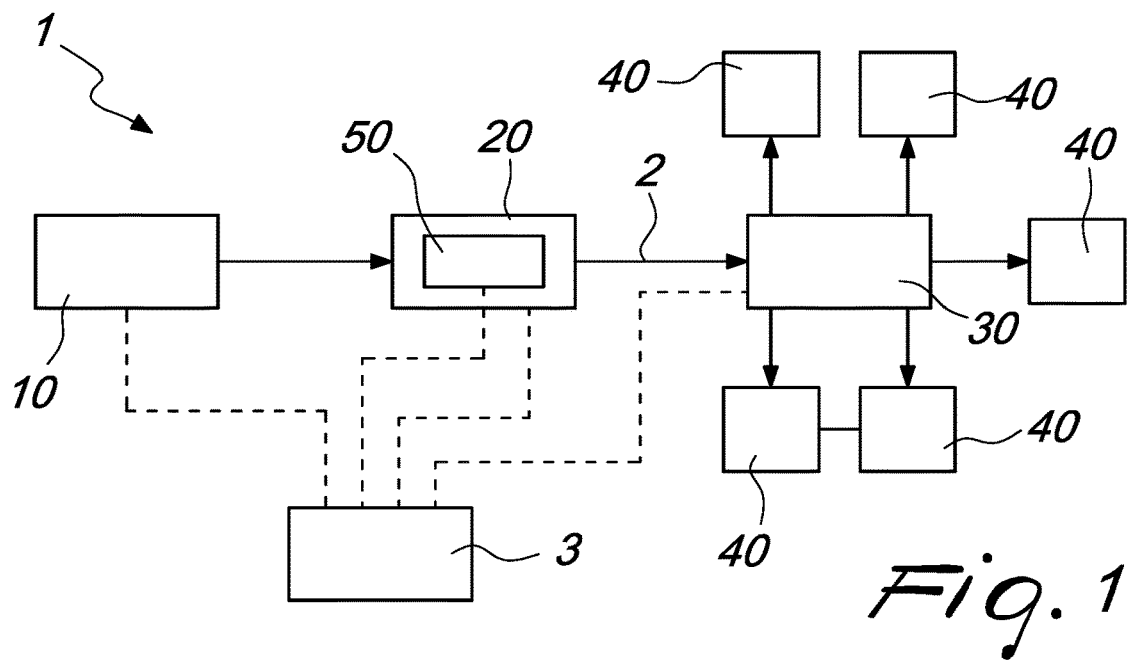
FIG. 1 is a block diagram of a first embodiment of the apparatus according to the disclosure.

With particular reference to the figures, the reference numeral 1 generally designates an apparatus for the treatment of horticultural products.

Usually, the apparatus 1 is designed for the treatment of a specific type of horticultural product, but the possibility that the same apparatus 1 may treat different types of products, especially if they are similar from the point of view of the shape and of the technical problems that they pose to manufacturers, is in any case within the protective scope claimed herein.

Furthermore, it is appropriate to specify that the apparatus 1 can be applied in relation to any horticultural product (fruit, vegetables, etc.), since, as will become apparent by reading the pages that follow, the particularities of the disclosure and in general the features of the apparatus 1 are independent of the specific type of horticultural product involved.

The treatment apparatus 1 comprises in series at least a first station 10, a second station 20, and a third station 30.

The first station 10 is configured to supply a handling and processing line 2 with an indiscriminate mass of horticultural products (a specific type of horticultural product). In this regard, it is specified that is typically the product reach the apparatus 1 directly from the picking fields (or from preceding pre-processing devices), where they are accumulated in containers of various kinds indeed in an indiscriminate manner, i.e., independently of their size, shape, color, degree of ripeness, etc. Moreover, leaves, twigs, soil and other debris often end up in the container. The thus heterogeneous products, accompanied by the debris mentioned above, are then transferred onto the line 2 at the first station 10.

In greater detail, typically the first station 10 is configured to supply progressively the line 2 with the indiscriminate mass of horticultural products according to a supply rate that corresponds to a predefined number of tons (or other weight measurement unit) of products in the unit time and/or to a predefined number of containers emptied onto the line 2 in the unit time. It should be noted that in view of the variability in terms of weight and dimensions of the horticultural products (and the potential presence of foreign objects), even assuming that the supply rate (indeed calculated as tons/hour or number of containers/hour) is kept constant, this is not matched by a constant number of products transferred onto the line 2 in the unit time.

The line 2 can have a plurality of different devices assigned to the handling of the horticultural products, so as to make them pass through the various sections of the apparatus 1 and therefore subject them to the desired treatments. For example, in fact (but in a non-limiting manner), the possibility is mentioned to provide along the line 2: tanks crossed by water currents (often used for apples or other floating products), conveyor belts, cups and/or trays and/or plates which can in any case move along a predefined path (each of which is designed to support and transfer a predefined number of horticultural products, and typically just one).

Downstream of the first station 10, the apparatus 1 then comprises a second station 20, which is arranged along the line 2 and is configured to acquire information related to at least one parameter of interest of each horticultural product in transit and to transmit this information to an electronic control and management unit 3.

The mode in which this information is acquired, as well as the specific choice of components and technologies adopted to provide the second station 20, may be any according to the requirements.

In an embodiment of considerable practical interest, which in any case does not limit the application of the disclosure, said second station 20 comprises an electronic vision system, configured to acquire said information related to the parameter of interest of each horticultural product in transit and transmit it to the electronic unit 3. Said at least one parameter of interest (both if the second station 20 indeed comprises the electronic vision system and if other solutions are adopted) is chosen from color, shape, dimensions, sugar content, degree of ripeness, defectiveness, weight, and the like. It is not excluded to acquire information regarding two or more of these parameters.

As is well known to the person skilled in the art, there are many commercially available solutions that can be adopted to perform the tasks indicated above and therefore for the practical provision of the second station 20 and in particular of the electronic system. In any case, usually these systems provide for one or more video cameras mounted inside a tunnel located along the line 2 and crossed by the horticultural products.

The electronic unit 3 can be of any type, and for example can be a controller or an electronic computer; typically, in any case, it is the same electronic element that supervises the operation of the entire apparatus 1.

In any case, it is specified that at the input of the second station 20 and in the downstream sections of the apparatus 1 typically (but not necessarily) the work cycles are designed in terms of number of items in the unit time, since it is necessary to manage independently each product in transit and/or the elements involved determine technological limitations to the maximum number of items that they can treat in the unit time.

Downstream of the second station 20, the apparatus 1 comprises a third station 30, which is arranged along the line 2 and is configured to convey selectively each horticultural product in transit toward one of at least two separate collection stations 40 (where baskets, crates, tanks, or containers of another type can be arranged). Conveyance is performed by the third station 30 on the basis of commands imparted by the electronic unit 3 as a function of the information acquired at least by the second station 20 (and optionally by other devices arranged along the line 2 and associated with the electronic unit 3).

The third station 30 sends each horticultural product to the specific station 40 designed to accommodate all and only the products for which the measured parameter assumes a predefined value (or falls within a predefined range). For example, it is possible to have different stations 40 to accommodate horticultural products having different weight or grammage, or having different colors (shades of color), or others still. In other words, the apparatus 1 allows to sort the horticultural products into uniform subgroups (each of which is accumulated in a respective station 40), at the same time being able to perform numerous other controls and checks.

It is in fact appropriate to specify that typically the apparatus 1 comprises an even large number of additional auxiliary stations, which are aimed at performing additional tasks and functions besides the ones described above.

For example, upstream of the second station 20 there can be additional stations aimed at the (manual or automatic) execution of preliminary checks and first selections on the products in transit (in order to segregate the ones that are rotten or otherwise obviously defective). Furthermore, upstream of the second station 20 there are typically (but not necessarily) additional stations that have the task of aligning the horticultural products according to one or more parallel lines, so as to facilitate the acquisition of the desired information by at least the second station 20.

Furthermore, along the line 2 there can be stations for reprocessing, (manual) quality control, washing, etc., as a function of the specific requirements.

In any case, it is specified that for the first station 10, the second station 20 and the third station 30 (as well as for any additional ones provided and for the line 2 itself), the person skilled in the art may in each instance choose easily, among the many options that are well-known and are in any case within the scope of ordinary knowledge in the field, the technical components that are most suited and the most appropriate methods for performing the functions to be carried out, obviously taking into account the particularities and the requirements of the specific type of horticultural product for which the apparatus 1 is intended.

According to the disclosure, the apparatus 1 comprises an electronic vision device 50, which is arranged along a chosen point of the line 2 which is comprised between the first station 10 and the second station 20 (and therefore optionally also at one of said stations) and is configured to count the number of horticultural products in transit.

The electronic device 50 also can be chosen of a per se known (or provided ad hoc) type.

The electronic unit 3 is functionally associated with the device 50 and is provided with instructions for varying automatically (at least temporarily) the supply rate of the line 2, on the part at least of the first station 10, as a function of the counting (individual or of a number at will of iterations) performed indeed by the electronic vision device 50.

With reference to the two typical (but not exclusive) methods with which it has already been shown that the supply rate is checked at the first station 10, the electronic unit 3 is therefore capable of increasing or decreasing (according to the requirements) the number of tons (or other weight measurement unit) of products transferred along the line 2 in the unit time and/or the number of containers emptied onto the line 2 in the unit time.

It is thus possible to compensate, with a sort of feedback control, any irregularity in supply (in terms of number of products loaded onto the line 2 in the unit time) detected at the point of the line 2 where the device 50 is located, so that the desired number of products indeed reaches the second station 20 in the unit time. This number typically (but not necessarily) corresponds to the ideal productivity and efficiency conditions, as a function of the technological constraints and of the bottlenecks imposed by the components involved downstream.

It should be noted, furthermore, that it is possible to slow down or speed up the supply rate in order to adapt it to a value of a number of products in the unit time that does not correspond to the maximum efficiency value: for example, in fact, the need might arise to slow down the entire process due to occasional problems on the machines, or due to a sudden accumulation of stock, which indeed requires acting in non-optimum efficiency and productivity conditions.

It should be noted, moreover, that in practice the variation of the rate will be performed differently as the type of machines involved in the first station 10 varies. Assuming for example that automation systems are provided therein which are capable of tipping progressively onto the line 2 the containers (and of replacing them with new full containers once they have been emptied), the electronic unit 3 is capable of increasing or decreasing the tipping (and/or replacement) rate of said containers.

The first station 10 can comprise a more complex and varied set of mutually cooperating elements, in any case in order to supply the line 2 with the horticultural products. For example, the first station 10 can comprise a pool and a lifter that picks up the products from the latter to transfer them along the line 2. In this case, the electronic unit 3 can be capable of adjusting the speed of the lifter and/or the rate at which the horticultural products are introduced in the pool.

In this manner it is possible to control indirectly also the quantity of products that is present in the pool at each instant (preventing them from being too many, with risk of damage, or too few, with inefficiencies due to irregular downstream supply). In other situations, the first station 10 is provided with dosage devices of various kinds, whose rate of supply of the horticultural products to the line 2 can indeed be adjusted by the electronic unit 3. More generally, it is stated once again that the first station 10 can have any sort of apparatuses aimed at supplying the line 2 as a function of the horticultural product and/or of the container used.

In particular, the electronic unit 3 is provided with instructions for verifying the match between the data supplied by the electronic device 50 and a predefined value, chosen as a function of the desired number of products to be supplied in the unit time at least to the second station 20. The electronic unit 3 is therefore provided with instructions to vary automatically the supply rate of the line 2 on the part of the first station 10, in case of negative outcome of this check (optionally providing a tolerance threshold, below which the electronic unit 3 in any case is not activated).

It is appropriate to specify that the counting performed by the device 50 may occur with any periodicity (up to being substantially continuous), as a function of the specific requirements, and this periodicity can be reprogrammed at will. Likewise, it is possible to program the electronic unit 3 so as to act on the supply rate of the first station 10 already after a single counting has given an outcome that is different from the desired one. As an alternative, the electronic unit 3 can wait for a chosen number of counting (optionally calculating the average of the obtained readings or performing other extrapolations) with an unwanted outcome, so as to activate the desired countermeasures when the irregularity is prolonged over time, indicating a non-momentary problem (which is possibly negligible).

Usefully, the electronic unit 3 is provided with instructions for varying automatically (in addition, as shown, to the supply rate) the transfer rate of the products in transit along at least one portion of the segment of the line 2 that is comprised between the first station 10 and the second station 20, in any case as a function of the counting performed by the electronic vision system 50.

In this regard, it should be noted that sometimes the transfer rate is determined in a fixed manner by the specific choice of the technical means used and cannot be varied except at the cost of deep modifications, which are well beyond the possibility of the electronic unit 3 and are in any case uneconomical. This is true, for example, when the horticultural products are transported, for a more or less long extent downstream of the first station 10, by a fluid current (water or others).

In other cases, instead, transfer is ensured by conveyor belts or other supporting elements, the speed of which can be varied more easily. Indeed in these cases, therefore, simultaneously with the variation of the supply rate, the electronic unit 3 can indeed force the belt (or other device) to slow down or speed up in order to adapt to the modifications imposed upstream and therefore to optimize its behavior and consumption (and further smooth the downstream supply).

In a possible embodiment, shown in the block diagram of FIG. 1, the electronic device 50 is integrated in the electronic vision system, which, as shown in the preceding pages, can be comprised in the second station 20. In other words, the apparatus 1 is provided with a single vision apparatus, which is given the dual task of analyzing the horticultural products in transit in order to estimate at least one parameter of interest thereof (in order to sort them adequately downstream) and of counting the products (in order to act in feedback on the supply rate).

With respect to the embodiment in which the electronic system and the electronic device 50 are kept distinct (which is in any case within the protective scope claimed herein), the embodiment shown in FIG. 1 can allow a cost containment, due to the reduction of the optical-electronic components and the necessary wiring. Furthermore, with this choice it is possible to use the information acquired by the electronic device 50 to vary the transfer rate of all or part of the segment comprised between the first station 10 and the second station 20, if, as shown, this is allowed by the technological constraints.

Figure 2:
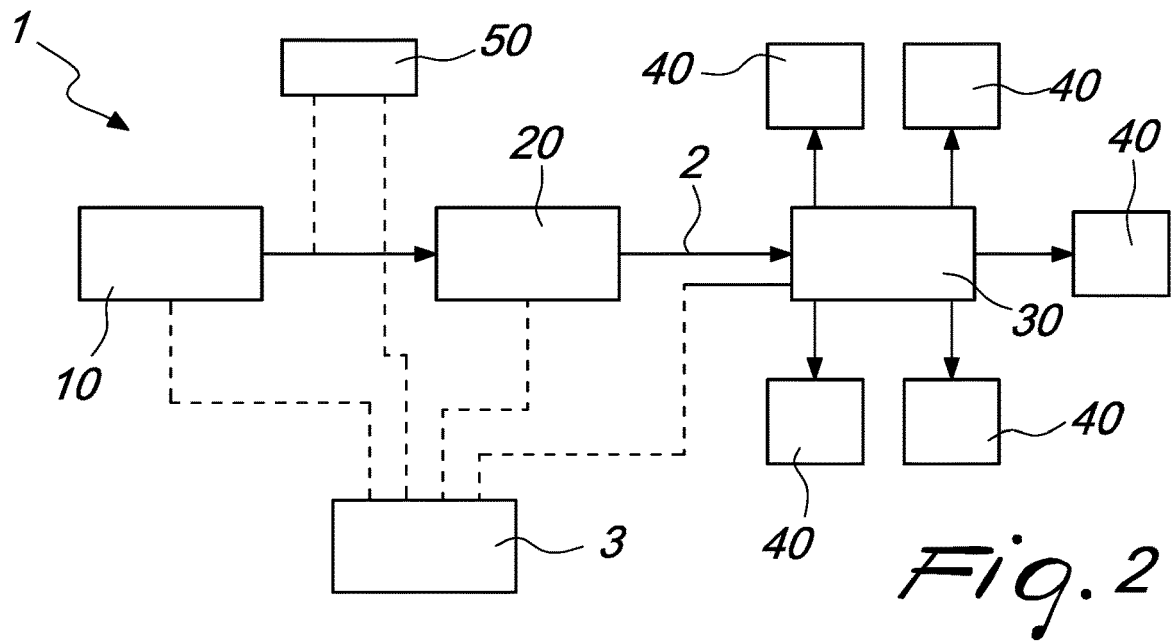
FIG. 2 is a block diagram of a second embodiment of the apparatus according to the disclosure.
Figure 3:
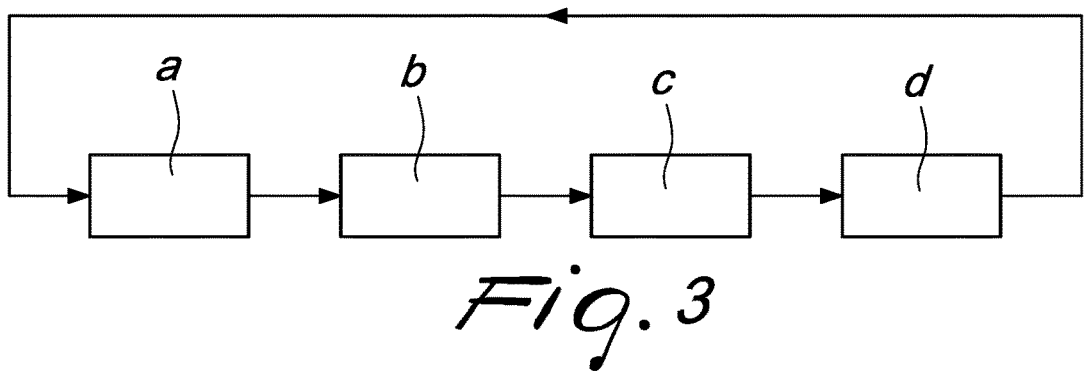
FIG. 3 is a block diagram of the method according to the disclosure.

In a different embodiment, shown in the block diagram of FIG. 2, the electronic device 50 is located in a chosen point of the line 2, upstream of the second station 20. Especially if one chooses to arrange the electronic device 50 a short distance away from the first station 10, this embodiment allows to reduce the time gap that elapses between the instant when the number of products loaded on the line 2 in the first station 10 deviates significantly from the desired one and the one when indeed this deviation is detected by the device 50. It is thus possible to obtain a more prompt and timely response by the electronic unit 3.

The electronic device 50 (be it integrated in the electronic vision system or not) can be provided with additional functionalities in order to optimize the apparatus 1.

In particular, advantageously the electronic device 50 can be provided with a module for verifying the transit of any foreign objects along the line 2. For example, therefore, the electronic device 50 is capable of detecting stones, twigs or other more or less bulky debris, which for various reasons can transit along the line 2 without having been caught and removed upstream. In this context, the electronic unit 3 may also receive data from the verification module and may activate appropriate countermeasures, such as the actuation of expulsion devices (for example jets of compressed air which can act transversely to the line 2 in order to make the unwanted objects fall to the side), the emission of alarm signals (optical, acoustic, etc.), or even the temporary stopping of the line 2.

As an alternative, or as a complement to what has been noted above, the electronic device 50 can be provided with a module for checking for any irregularities in the spatial distribution of the horticultural products along said line 2. In fact (and even when the supply of the desired number of products in the unit time has been achieved), the horticultural products may form more or less substantial accumulations on a portion of the belt that conveys them with respect to the laterally adjacent portions (for example, by being arranged all along the right side of the belt and leaving the left one empty). This is in any case a situation that is potentially damaging and/or indicates a non-optimum operation of the upstream components.

Therefore, in this case also the electronic unit 3 is capable of activating appropriate countermeasures as a function of what has been detected.

A subject matter of the present description, like the apparatus 1 described until now, is a method for the control of the latter (having at least some of the specifications described above and at least the first station 10, the second station 20, and the third station 30).

The method includes, in a step a., in counting the number of horticultural products in transit along a chosen point of the line 2 comprised between the first station 10 and the second station 20.

The method according to the disclosure furthermore includes, in a step b., in sending the number counted in step a. to the control and management unit 3.

Thus, in a step c. of the process, it is possible to verify (on the part of the electronic unit 3) the match between the data obtained in step a. and a predefined value, chosen as a function of the desired number of products to be supplied in the unit time at least to the second station 20.

In case of a negative outcome of the check performed in step c., the method therefore provides, in a step d., for varying (at least temporarily) the supply rate of the line 2 on the part of at least the first station 10 in order to restore the match between the horticultural products in transit and said predefined value.

As has already been noted in the preceding pages, the variation may occur already after a single counting that has an unwanted outcome or after a predefined number of iterations having an unsatisfactory outcome in any way.

The method then provides for repeating steps a. to d. with a preset periodicity and/or substantially continuously.

The operation of the apparatus and the execution of the method have already been described in practice extensively in the preceding pages; in any case, a brief summary thereof is proposed hereinafter.

In the first station 10, the horticultural products (an indiscriminate mass of a specific fruit or of a specific type of vegetable) are progressively tipped along the line 2, according to a supply rate that is set in various manners, but usually without the possibility to monitor the exact number of horticultural products which, in the unit time considered, are actually introduced along the line 2.

Along said line, the horticultural products encounter at least a second station 20, which detects (by means of an electronic vision system or in another manner) at least one parameter of interest for each one of them, chosen for example from color, shape, dimensions, sugar content, degree of ripeness, defectiveness, weight, and the like.

Downstream of the second station 20, therefore, in a third station 30, each product is assigned to the most appropriate collection station 40 on the basis of the commands imparted by the electronic unit 3 as a function indeed of what has been detected (at least) in the second station 20.

Along a point of the line 2 that is comprised between the first station 10 and the second station 20, the electronic vision device 50 counts the horticultural products in transit. The device 50 thus allows to obtain (with a minimal delay, which depends on its arrangement along the line 2) the information that could not be detected directly in the first station 10 regarding the number of products actually unloaded. This information is used by the electronic unit 3 to adjust accordingly the supply rate at the first station 10, thus remedying any abnormal loadings that have just occurred.

This allows to adapt the number of products actually loaded onto the line 2 to the requirements and technological constraints of the downstream apparatuses and in particular of the second station 20 and of the third station 30 (in which one wishes to treat a very specific number of products in the unit time).

The presence of the electronic device 50 and the method that it allows to perform therefore allow to compensate for any irregularities in the supply of the horticultural products, effectively remedying the impossibility to know precisely the number of products that at each instant are tipped onto the line 2 (the number of products in transit can in fact be corrected promptly by the electronic unit 3 indeed as a consequence of the counting performed by the electronic device 50).

The choice to adopt an electronic device 50 allows to give the apparatus 1 additional useful functionalities, utilizing the possibilities of the software with which said device 50 is provided: it has in fact already been shown that the latter can be configured to check for any irregularities in the spatial distribution of the horticultural products and/or the transit of any foreign objects along the line 2 (adopting, if necessary, effective countermeasures and preventing these events from being able to damage the apparatus 1 or causing downtimes and inefficiencies).

The disclosure thus conceived is susceptible of numerous modifications and variations, all of which are within the scope of the appended claims; all the details may furthermore be replaced with other technically equivalent elements.

In the exemplary embodiments shown, individual characteristics, given in relation to specific examples, may actually be interchanged with other different characteristics that exist in other exemplary embodiments.

In practice, the materials used, as well as the dimensions, may be any according to the requirements and the state of the art.

The disclosures in Italian Patent Application no. 102019000013407, from which this application claims priority, are incorporated herein by reference.

The invention claimed is:

1. An apparatus for the treatment of horticultural products, comprising in series at least:
   a first station, configured for supplying a handling and processing line with an indiscriminate and heterogenous mass of horticultural products at a supply rate that corresponds to a predefined weight measurement unit of products in a unit time and/or to a predefined number of containers emptied onto said handling and processing line in the unit time such that said products are supplied at said first station with a variable and non-constant number of said products in said unit time;
   a second station, arranged along said handling and processing line downstream of said first station and configured for the acquisition of information related to at least one parameter of interest of each horticultural product in transit and for the transmission of said information to an electronic control and management unit;
   a third station, arranged along said handling and processing line downstream of said second station and configured for the selective conveyance of each horticultural product in transit toward one of at least two distinct collection stations, on the basis of commands sent by said electronic control and management unit as a function of the information acquired at least by said second station; and
   further comprising an electronic vision device, arranged along a chosen point of said handling and processing line that is comprised downstream of said first station up to and including said second station, and is configured to count a number of horticultural products in transit, said electronic control and management unit, functionally associated with said electronic vision device, being provided with instructions for an automatic variation of said supply rate of said handling and processing line, on the part of at least said first station, as a function of the counting performed by said electronic vision device.

2. The apparatus according to claim 1, wherein said electronic control and management unit is provided with instructions for checking a match between data supplied by said electronic vision device and a predefined value, chosen as a function of a desired number of products to be supplied in said unit time at least to said second station, said electronic control and management unit being provided with instructions for the automatic variation of the supply rate of said handling and processing line, on the part of said first station, in case of a negative outcome of said check.

3. The apparatus according to claim 2, wherein said electronic control and management unit is provided with instructions for the automatic variation of said supply rate of the products in transit, along at least one portion of a segment of said handling and processing line that is comprised between said first station and said second station, as a function of a counting performed by said electronic vision device.

4. The apparatus according to claim 2, wherein said second station comprises an electronic vision system, configured for the acquisition of said information related to said at least one parameter of interest of each horticultural product in transit and for the transmission of said information to said electronic control and management unit, said at least one parameter being chosen from color, shape, dimensions, sugar content, degree of ripeness, defectiveness, and weight.

5. The apparatus according to claim 4, wherein said electronic vision device is integrated in said electronic vision system.

6. The apparatus according to claim 2, wherein said electronic vision device is provided with a module for checking the transit of any foreign objects along said handling and processing line.

7. The apparatus according to claim 2, wherein said electronic vision device is provided with a module for checking any irregularities in a spatial distribution of the horticultural products along said handling and processing line.

8. A method for controlling an apparatus according to claim 2, the method including the following steps:
   a. counting the number of horticultural products in transit along said chosen point of said handling and processing line that is comprised between said first station and said second station,
   b. sending a number counted in said step a. to said electronic control and management unit,
   c. checking a match between data obtained in said step a. and a predefined value, chosen as a function of a desired number of products to be supplied in said unit time at least to said second station, and
   d. in case of a negative outcome of the check performed in said step c., varying the supply rate of said handling and processing line, on the part at least of said first station, to restore the match between the horticultural products in transit and said predefined value,
   said steps a. to d. being repeated with a preset periodicity and/or substantially continuously.

\* \* \* \* \*